United States Patent Office 2,969,376
Patented Jan. 24, 1961

2,969,376

ALKOXY PEROXIDES

Robert H. Perry, Jr., Baytown, Tex., assignor, by mesne assignments, to Esso Research and Engineering Company, Elizabeth, N.J., a corporation of Delaware No Drawing. Filed May 13, 1957, Ser. No. 658,494

3 Claims. (Cl. 260—338)

This invention relates to the preparation of alkoxy peroxides. More particularly, this invention relates to a novel class of alkoxy peroxides obtainable from bicyclo (2.2.1)-2-heptenes.

Bicyclo(2.2.1)-2-heptenes may be prepared by the Diels-Alder reaction of cyclopentadiene or dicyclopentadiene with a monoolefin such as, for example, ethylene, propene, 1-butene, 2-butene, 1-pentene, 2-methyl-2-butene, etc.

It has been discovered in accordance with the present invention that such bicyclo(2.2.1)-2-heptenes when ozonized in solution in a normal $C_1$ to $C_{10}$ aliphatic alcohol at a temperature within the range of about $-100°$ to about $-20°$ C. provided alkoxy peroxides having the formula:

(I)
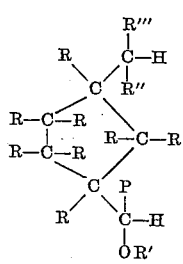

wherein R is selected from the class consisting of hydrogen and $C_1$ to $C_4$ alkyl groups; wherein P and R″ taken together are a cyclyzing peroxide group and R‴ is OH or OR′ and otherwise P is a hydroperoxide group and R″ and R‴ taken together are oxygen; and wherein R′ is a normal $C_1$ to $C_{10}$ alkyl group.

Thus, there may be provided hydroperoxides of the formula:

(II)
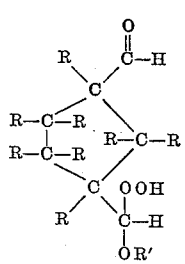

hemiperacetals of the formula:

(III)
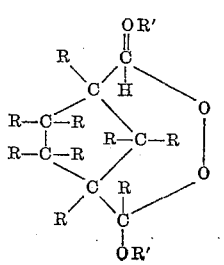

and peracetals of the formula:

(IV)
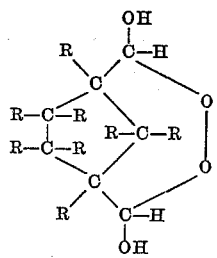

wherein R and R′ have the meaning given above.

The alkoxy peroxides of the present invention are obtained by dissolving a bicyclo(2.2.1)-2-heptene such as norbornylene [bicyclo(2.2.1)-2-heptene], 2-methyl-bicyclo(2.2.1)-2-heptene, 6-methyl-bicyclo(2.2.1)-2-heptene, 2-ethyl-bicyclo(2.2.1)-2-heptene, 5-ethyl-bicyclo(2.2.1)-2-heptene, 2,3-dimethyl-bicyclo(2.2.1)-2-heptene, 5,6-dimethyl-bicyclo(2.2.1)-2-heptene, or a mixture thereof in a suitable normal $C_1$ to $C_{10}$ alcohol (e.g., methanol, ethanol, n-propanol, n-butanol, amyl alcohol, heptanol, octanol, decanol, etc. or a mixture thereof) and by flowing a gaseous mixture of oxygen and ozone containing from about 2 to 6 volume percent of ozone through the resultant solution at a temperature within the range of about $-100°$ to about $-20°$ C. at a rate of gas passage within the range of about 0.2 to about 0.5 cubic foot of gaseous mixture per mol of the bicyclo(2.2.1)-2-heptene starting material in accordance with the method disclosed and claimed in copending Bailey application S.N. 658,493, filed May 13, 1957, and entitled "Process for the Preparation of Alpha, Omega-Dicarboxylic Acids," now abandoned. For best result it is preferably to employ a temperature within the range of about $-60°$ to about $-80°$ C. An excess of alcoholic solvent should be employed and in no event should less than about 2 mols of alcohol per mol of bicyclo(2.2.1)-2-heptene be employed. It is preferable to utilize from about 5 to 15 mols of alcoholic solvent per mol of bicyclo(2.2.1)-2-heptene. The oxygen-ozone mixture should be passed through the alocoholic solution for a period of time sufficient to permit the absorption of about 1 mol of ozone per mol of bicyclo(2.2.1)-2-heptene starting material. Normally, a reaction time of from about 0.5 to about 5 hours is required.

At the end of the reaction period, the ozonolysis product may be warmed to room temperature and excess solvent may then be removed by any suitable means such as evaporation to provide a product consisting essentially of the alkoxy peroxides of the present invention.

The alkoxy peroxides of the present invention are stable at room temperature or lower.

The alkoxy peroxides of the present invention may be used for a wide variety of purposes such as polymerization catalysts, as intermediates for the preparation of cis-cyclopentane-1,3-dicarboxylic acids, as intermediates in the preparation of lubricants and plasticizers, etc.

The invention will be further illustrated by the following specific examples which are given by way of illustration and not as limitations on the scope of this invention.

EXAMPLE I

Dissolve about 3 grams of norbornylene in about 60 cc. of methanol and pass a mixture of ozone and oxygen containing about 2.5 weight percent of ozone through the solution at the rate of about 0.02 cubic foot of gas perminute at a temperature of about $-75°$ C. Next pass the gas through a 2% potassium iodide solution. Continue the passage of the gas sequentially through the methanol solution of norbornylene and the potassium iodide solution until extensive oxidation of the iodide ions of the potassium iodide solution occurs. When this happens, terminate the ozonolysis reaction. The reaction period will normally be about one and one-half hours in duration and about 1 mol of ozone per mol of norbornylene will be absorbed. At the end of the reaction warm the reaction mixture to room temperature and allow excess methanol to evaporate. A clear, colorless product is obtained consisting essentially of a mixture of a hydroperoxide and the peracetal and hemiperacetal thereof having the following formulae:

(V)
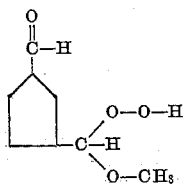
[ω-(3-formyl-cyclopentyl)-ω-methoxymethyl hydroperoxide]

(VI)
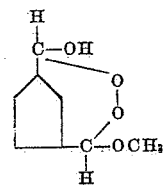
[2-hydroxy-5-methoxy-3,4-dioxabicyclo(4.2.1)nonane]

(VII)
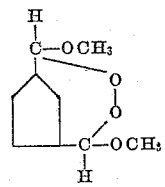
[2,5-dimethoxy-3,4-dioxabicyclo(4.2.1)nonane]

A summary of the physical and chemical properties of the reaction product is given in the following table.

Table I
SOLUBILITY

| Insoluble | Soluble | Slightly Soluble |
|---|---|---|
| $CS_2$ | $CH_3OH$ | $C_6H_6$ |
| $CCl_4$ | $C_2H_5OH$ | $CHBr_3$ (with discoloration) |
| Petroleum Ether | HOAc | |
| | HCOOH | |
| | Dioxane | |

REACTIVITY OF METHANOL SOLUTION PRODUCT TOWARD VARIOUS REAGENTS

| | No Reaction | Faint | Moderate | Strong | Remarks |
|---|---|---|---|---|---|
| NaI (in HOAc) | | | | X | |
| Pb(OAc)$_4$ | | | X | | |
| H$_2$O—room temp | X | | | | |
| Solid NaOH | X | | | | |
| 5% NaOH | | | X | | Bubbles released and darkened when heated solution. |
| 5% HCl (cold) | X | | | | |
| 5% HCl (hot) | | X | | | Very slow reaction. |
| Conc. HCl (hot) | | | | X | Tar obtained when boiled. |
| dil. HNO$_3$ (hot) | | | | X | Violent reduction of HNO$_3$. |
| Fuchsin test | | | | X | |
| Tollen's test | X | | | | |
| 2% KMnO$_4$ (aq.) | | | | X | |
| 30% H$_2$O$_2$ (cold) | X | | | | |

| Analysis | Percent Active Oxygen | Percent C | Percent H | Percent OCH$_3$ |
|---|---|---|---|---|
| Calc'd. for C$_9$H$_{16}$O$_4$ | 7.16 | 54.73 | 8.39 | 33.16 |
| | 6.73 | | | |
| | 8.5 | 57.10 | 8.53 | 32.80 |

Infrared analysis: Strongly hydrogen-bonded OH at 3.0μ, carbonyl absorption at 5.85μ.

EXAMPLE II

Repeat Example I but in this instance substitute n-butanol for the methanol of Example I. In this instance the alkoxyl groups of the reaction products are butoxy groups.

EXAMPLE III

Repeat Example I but in this instance utilize 5-ethyl-bicyclo-(2.2.1)-2-heptene as a starting material in the place of norbornylene. The reaction product is ω-(3-formyl-5-ethylcyclopentyl)-ω-methoxy methyl hydroperoxide and the peracetal and hemiperacetal thereof.

EXAMPLE IV

As has been indicated, the alkoxy hydroperoxides of the present invention may be utilized for the selective preparation of cis-cyclopentane-1,3-dicarboxylic acid. As an example, dissolve about 7.5 grams of the reaction product of Example I in about 35 ml. of 90% formic acid at room temperature and add thereto about 10 grams of 30% hydrogen peroxide (about 2.5 mols of hydrogen peroxide per mol of alkoxy peroxide). Warm the solution to about 50° C. A vigorous oxidation reaction is initiated which proceeds spontaneously. Reflux the solution for approximately one hour after the vigorous reaction has subsided during which time active oxygen activity is lost and hydrogen peroxide consumption ceases. Evaporate the formic acid solution to dryness to obtain a white crystalline precipitate. Dissolve the precipitate in a minimal amount of ice water, filter and recrystallize. The product is substantially pure cis-cyclopentane-1,3-dicarboxylic acid melting at 120.5° to 121.5° C. The observed neutral equivalent is 80.0 (calculated 79.2). The elemental analysis is: C, 53.177; H, 6.38 (the theoretical value calculated for C$_7$H$_{10}$A$_4$ is: C, 52.98; H, 6.18). The product is soluble in water, acetone, alcohol, ether, and hot benzene and is insoluble in carbon disulfide and petroleum ether.

The alkoxy peroxides of the present invention, as mentioned, may be used for the polymerization of vinyl monomers. A mixture of the hydroperoxides, hemiperacetals and peracetals of the present invention comprises a particularly desirable polymerization catalyst in that the peracetal is a comparatively stable compound which exists in equilibrium with the more highly active hydroperoxide and hemiperacetal. As a consequence, when the reaction mixture is added to a vinyl monomer to be polymerized, the alkoxy hydroperoxide decomposes readily to initiate the polymerization reaction, which polymerization reaction is sustained by the slow decomposition of hemiperacetal to the alkoxy hydroperoxide during the course of the polymerization reaction.

This is illustrated by the following.

EXAMPLE V

Dissolve about 0.01 gram of the reaction product of Example I in about 10 grams of freshly distilled monomeric methyl acrylate to provide a solution of about 0.1 weight percent of the peroxide mixture in methyl acrylate. Heat the resultant solution to about 70° C. A smooth polymerization reaction is initiated as evidenced by the formation of a homogeneous, colorless, highly viscous polymer oil after about 3 hours of heating. The oil polymerizes to a hard, transparent resin after about an additional 2 hours of heating at 70° C.

When styrene is substituted for the methyl acrylate of Example V and the example is otherwise repeated at a polymerization temperature of about 70° C., a clear, colorless high polymer product is again obtained.

In contrast, when tertiary butyl hydroperoxide is substituted for the peroxide mixture and Example V is otherwise repeated with the methyl acrylate monomer at 70° C., unsatisfactory results are attained in that rapid decomposition of the tertiary butyl hydroperoxide occurs, leading to substantial gas evolution when polymerization is initiated. As a consequence, with a rapid initial decomposition of the tertiary butyl hydroperoxide, a liquid product is obtained which does not polymerize on further heating for 5 hours at 70° C. In further contrast, when cumene hydroperoxide is substituted for the peroxide mixture of the present invention and Example V is otherwise repeated, polymer formation does not occur in that decomposition of the cumene hydroperoxide is extremely slow at the polymerization temperature of 70° C.

From the foregoing it is seen, therefore, that continuous or stepwise catalyst addition and the use of high polymerization temperatures is avoided when a vinyl monomer is polymerized in the presence of a mixture of the acetals and hemiperacetals of the present invention.

As exemplified by the foregoing examples, therefore, a feature of the present invention is the polymerization or copolymerization of a vinyl monomer such as styrene, methyl acrylate, methyl methacrylate, acrylonitrile, vinyl acetate, vinyl halides such as vinyl chloride, vinyl ketones, vinyl sulfonamides, etc., butadinene, chloroprene, etc., and suitable mixtures thereof in the presence of a catalytic amount of a mixture of a peracetal of the present invention and a hemiperacetal of the present invention. In general, from about 0.01 to about 0.5 part of catalyst mixture per part of monomer should be employed. Particularly desirable results are attained by conducting the polymerization reaction at a temperature within the range of about 50° to 100° C. whereby controlled decomposition of the catalyst mixture will occur to provide for a substantially constant polymerization rate.

Polymerization of vinyl monomers may be conducted in accordance with the present invention with a mass, suspension, solution, emulsion, etc. polymerization process in accordance with techniques known to those skilled in the art.

What is claimed is:

1. A compound selected from the group consisting of peroxides having the formulae:

(II)

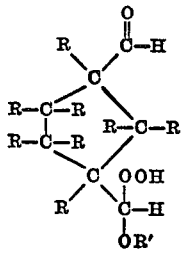

(III)

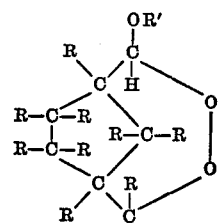

(IV)

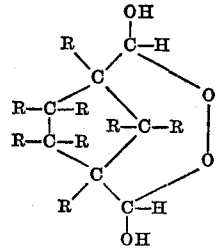

wherein R is selected from the class consisting of hydrogen and $C_1$ to $C_4$ alkyl groups; and wherein R' is a normal $C_1$ to $C_{10}$ alkyl group.

2. A compound having the formula:

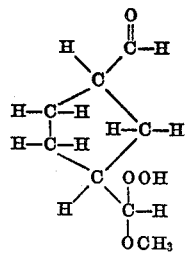

3. A compound having the formula:

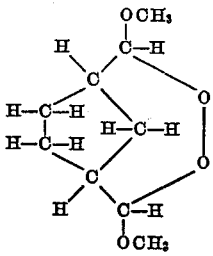

References Cited in the file of this patent
UNITED STATES PATENTS

| | | |
|---|---|---|
| 2,349,768 | Strain | May 23, 1944 |
| 2,717,264 | Rust et al. | Sept. 6, 1955 |
| 2,733,270 | Fisher | Jan. 31, 1956 |
| 2,735,870 | Fisher et al. | Feb. 21, 1956 |
| 2,807,650 | Webster et al. | Sept. 24, 1957 |
| 2,818,435 | Bain et al. | Dec. 31, 1957 |